(12) United States Patent
Beukema et al.

(10) Patent No.: US 6,185,642 B1
(45) Date of Patent: Feb. 6, 2001

(54) BUS FOR HIGH FREQUENCY OPERATION WITH BACKWARD COMPATIBILITY AND HOT-PLUG ABILITY

(75) Inventors: Bruce Leroy Beukema, Hayfield; Ronald Edward Fuhs, Rochester, both of MN (US); Richard Allen Kelley, Apex, NC (US); Danny Marvin Neal, Round Rock; Steven Mark Thurber, Austin, both of TX (US)

(73) Assignee: International Business Machines Corporation, Armonk, NY (US)

( * ) Notice: Under 35 U.S.C. 154(b), the term of this patent shall be extended for 0 days.

(21) Appl. No.: 09/116,058

(22) Filed: Jul. 15, 1998

(51) Int. Cl.[7] .................................................... G06F 13/00
(52) U.S. Cl. ............................ 710/60; 710/60; 710/103; 713/501
(58) Field of Search ................................ 710/33, 60, 62, 710/100, 103; 713/400, 500, 501, 600; 709/233

(56) References Cited

U.S. PATENT DOCUMENTS

| 4,701,841 | 10/1987 | Goodrich et al. ................... 710/126 |
| 5,191,653 | 3/1993 | Banks et al. . |
| 5,404,462 | 4/1995 | Datwyler et al. ................... 713/600 |
| 5,727,171 | 3/1998 | Iachetta, Jr. ......................... 710/107 |
| 5,774,706 | 6/1998 | Neal, et al. . |
| 5,809,291 | 9/1998 | Munoz-Bustamante et al. ... 713/501 |
| 5,832,397 | 11/1998 | Yoshida et al. ....................... 701/29 |
| 5,838,995 | 11/1998 | Chen et al. ........................... 710/60 |
| 5,978,869 | 11/1999 | Guthrie et al. ....................... 710/60 |

Primary Examiner—Thomas C. Lee
Assistant Examiner—Chun Cao
(74) Attorney, Agent, or Firm—Volel Emile; Felsman, Bradley, Vaden, Gunter & Dillon, LLP (57) ABSTRACT

A peripheral interconnect for a computer system comprising a bridge, a peripheral bus, and a peripheral device, wherein at least one of these components is adapted to selectively operate in either a high performance mode or a low performance mode, the high performance mode using a first operating speed and a first protocol, and the low performance mode using a second operating speed which is lower than said first operating speed, and a second protocol which is different from the first protocol. The disclosed embodiment provides a high performance mode with a 100 MHz speed and a protocol that disallows pacing, and a low performance mode that uses a 66 MHz or 33 MHz speed and a standard PCI protocol that allows pacing. The high performance operating speed can be twice the low performance operating speed, by doubling the clock frequency and clocking data on only one clock edge, or by clocking data on both a rising edge and a falling edge of a clock signal while operating at the lower clock frequency. High performance adapters can provide split transaction capability, with a high performance bridge having the ability to support split transactions or alias split transactions to delayed transactions. Backward compatibility may also be provided for optional features such as hot-pluggability.

30 Claims, 3 Drawing Sheets

BUS FOR HIGH FREQUENCY OPERATION WITH BACKWARD COMPATIBILITY AND HOT-PLUG ABILITY

BACKGROUND OF THE INVENTION

1. Field of the Invention

The present invention generally relates to computer systems, specifically to a method and apparatus for interconnecting various computer components (i.e., peripheral devices), and more particularly to such a method and apparatus which allows backward compatibility with different computer bus designs, including bus designs having different clock speeds.

2. Description of Related Art

A typical structure for a conventional computer system includes one or more processing units connected to a system memory device (random access memory or RAM) and to various peripheral, or input/output (I/O), devices such as a display monitor, a keyboard, a graphical pointer (mouse), and a permanent storage device (hard disk). The system memory device is used by a processing unit in carrying out program instructions, and stores those instructions as well as data values that are fed to or generated by the programs. A processing unit communicates with the other components by various means, including one or more interconnects (buses), or direct access channels. A computer system may have many additional components, such as serial and parallel ports for connection to, e.g., printers, and network adapters. Other components might further be used in conjunction with the foregoing; for example, a display adapter might be used to control a video display monitor, a memory controller can be used to access the system memory, etc.

Several different bus designs have been developed for interconnecting the various computer components. The original personal computer (PCs) introduced by International Business Machines Corp. (IBM—assignee of the present invention) used an "expansion" bus referred to as the XT bus, which allowed a user to add various optional devices, such as additional memory (RAM), sound cards, telephone modems, etc. This early design was improved upon by adding more data and address lines, new interrupt lines, and direct memory-access (DMA) control lines, to create the well-known AT bus, which is also referred to as the Industry Standard Architecture (ISA) bus. The AT design allowed the microprocessor to run at a faster speed than the expansion bus. A 32-bit extension to this bus was later created, which is referred to as the Extended Industry Standard Architecture (EISA). Another 32-bit expansion bus developed by IBM is the Microchannel Architecture (MCA) bus.

In addition to the foregoing designs, several other bus designs have been developed allowing the use of a system bus which interconnects the processor and the system memory device(s), along with a separate, local bus which interconnects the peripheral devices to the system bus (using a bus bridge). Two well-known standards are the Video Electronics Standards Association (VL) bus, and the Peripheral Component Interconnect (PCI) bus.

The 33 MHz PCI specification allows up to 4 PCI-compliant expansion cards to be installed in "slots" constructed along the PCI bus. More specifically, 10 "loads" are allowed, with each slot (connector) and its corresponding card together comprising two loads (a soldered device is counted as one load). An expansion bus controller for a system's ISA, EISA, or MCA slots can optionally be installed as well, providing increased synchronization for all of the system's expansion bus-installed resources. A PCI host bridge provides synchronization between the system bus and the PCI bus, and allows certain "intelligent" PCI-compliant adapters to perform tasks concurrently with the microprocessor, using a technique called bus mastering.

Figure 1:
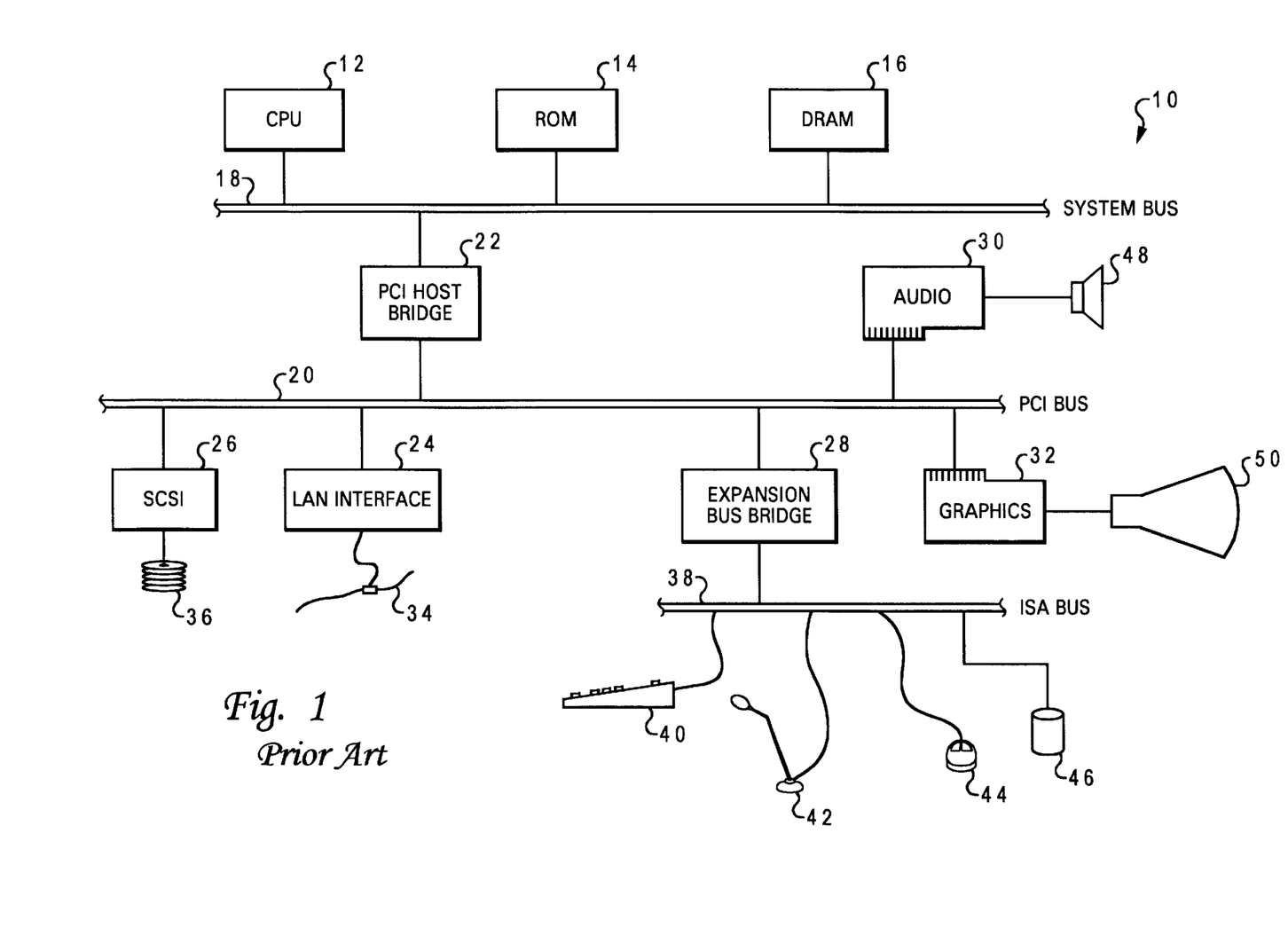
FIG. 1 is block diagram of a conventional computer system having a Peripheral Component Interconnect (PCI) bus which allows peripheral devices to be added to the computer system.

A typical PCI system 10 is illustrated in FIG. 1. System 10 includes a central processing unit (CPU) 12, firmware or read-only memory (ROM) 14, and a dynamic random access memory (DRAM) 16 which are all connected to a system bus 18. CPU 12, ROM 14 and DRAM 16 are also coupled to a PCI local bus 20 using a PCI host bridge 22. PCI host bridge 22 provides a low latency path through which processor 12 may access PCI devices mapped anywhere within bus memory or I/O address spaces. PCI host bridge 22 also provides a high bandwidth path that allows the PCI devices to access DRAM 16.

Attached to PCI local bus 20 are a local area network (LAN) adapter 24, a small computer system interface (SCSI) adapter 26, an expansion bus bridge 28, an audio adapter 30, and a graphics adapter 32. Lan adapter 24 is used to connected computer system 10 to an external computer network 34. SCSI adapter 26 is used to control high-speed SCSI disk drive 36. Expansion bus bridge 28 is used to couple an ISA expansion bus 38 to PCI local bus 20. As shown, several user input devices are connected to ISA bus 38, including a keyboard 40, a microphone 42, and a graphical pointing device (mouse) 44. Other devices may also be attached to ISA bus 38, such as a CD-ROM drive 46. Audio adapter 30 controls audio output to a speaker 48, and graphics adapter 32 controls visual output to a display monitor 50.

In earlier computer systems, all of the peripheral components had to be connected (inserted in the PCI or ISA slots) at the time that the computer was first turned on, in order to properly register (initialize) the devices with the computer's operating system. These devices are checked during the system's power-on self test (POST), which includes a set of routines stored in ROM 14 (also referred to as read-only storage, or ROS) that test the peripherals to see if they are properly connected and operating.

In the earlier systems, if a device were simply not present on the bus during the POST, then it would not be recognized when it was later attached (while the computer was still running). Instead, those systems were required to be "rebooted" in order to be able to communicate with and utilize the later-added devices. "Rebooting" refers to the restarting of a computer system by reloading its most basic program instructions, viz., the operating system. A system can be rebboted using the software itself (a warm boot) or by actuating the system's hardware, i.e., the reset or power buttons (a cold boot). After rebooting, the new device can be identified using various techniques.

More recent computer systems have the ability to recognize devices which are added while the computer is operating, that is, without having to reboot the system and without requiring manual configuration steps. One example is the "plug and play" specification, which allows a PC to configure itself automatically to work with peripherals. A user can "plug" in a peripheral and "play" it without manually configuring the system. Plug and play operation requires both ROM that supports the specification, and a special expansion card. While this approach allows the system to recognize a newly added device, it is still often necessary to reset the system in order to properly initialize the device with the operating system. A further improvement in this area is the "hot-plug" specification, wherein separate reset lines are provided for each peripheral device, such that a device can be initialized with the operating system without requiring the entire system to be rebooted (this ability of the device/system is referred to as "hot-pluggable").

One problem that has arisen with this multitude of bus designs is backward compatibility, particularly for bus components operating at different speeds. The current PCI bus architecture defines 33 and 66 MHz capability. The "M66EN" pin on the bus is used to indicate whether operation is to be at 33 MHz or 66 MHz. This pin is tied to ground in the 33 MHz design, but connected to pull-up resistors in 66 MHz devices. Therefore, if any 33 MHz device is connected to the bus, the M66EN pin will be grounded even if 66 MHz devices are present, and so a 66 MHz PCI host bridge will know to operate the bus at the lower speed of 33 MHz. The M66EN pin provides only limited compatibility, however, in that it is confined to these two specific clock speeds, and also in that operation of the bus is essentially the same for either speed, that is, operation at 66 MHz involves substantially the same electrical characteristics and basic protocols as at 33 Mhz (although a 66 MHz bus is limited to two slots). For example, the PCI specification for both 33 MHz and 66 MHz uses a technique known as "pacing" of address and data cycles. In other words, this approach does not provide compatibility for new bus designs having even higher speeds or, in particular, different protocols. Compatibility issues are further complicated by features such as hot-pluggability.

In light of the foregoing, it would be desirable to provide not only a method of operating a bus at higher frequencies, but further to provide backward compatibility for such high performance bus designs, e.g., compatibility with both the 33 MHz and 66 MHz PCI architectural definitions. It would be further advantageous if the method could provide compatibility with advanced or optional bus features such as hot-plug capability.

SUMMARY OF THE INVENTION

It is therefore one object of the present invention to provide an improved computer system having an expansion bus which allows the addition of peripheral devices to the system.

It is another object of the present invention to provide such a bus having improved performance, particularly using higher clock speeds.

It is yet another object of the present invention to provide such a bus design wherein high performance components are compatible with older devices that operate at lower speeds and use different protocols.

The foregoing objects are achieved in a method of providing an interconnection between a peripheral device and a system bus of a computer system, generally comprising the steps of connecting a bridge to the system bus, connecting a peripheral bus to the bridge, and connecting a peripheral device to said peripheral bus, wherein at least one of said bridge, said peripheral bus, and said peripheral device is adapted to selectively operate in either a high performance mode or a low performance mode. The high performance mode uses a first operating speed and a first protocol, and the low performance mode uses a second operating speed which is lower than said first operating speed, and a second protocol which is different from the first protocol. For example, a high performance mode may be provided with a 100 MHz speed and a protocol that disallows pacing, with a low performance mode that uses a 66 MHz or 33 MHz speed and a protocol that allows pacing. If the bridge, peripheral bus, and peripheral device(s) are all high performance components, then the peripheral system operates in the high performance mode. If, however, any one of the components is limited to low performance, then the entire system runs in low performance mode, i.e., the high performance components operate in a backward compatible mode. The bus can have a high performance operating speed which is approximately twice the second operating speed, by operating the bus at a higher operating frequency of 100 MHz (twice the lower frequency mode of 50 MHz), or by clocking data on both a rising edge and a falling edge of a clock signal at a lower operating frequency of 50 MHz (resulting in a data rate of 100 MHz). High performance adapters can provide split transaction capability, with a high performance bridge having the ability to optionally support split transactions or alias split transactions to delayed transactions. Backward compatibility may also be provided for optional features such as hot-pluggability.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODINENT

Figure 2:
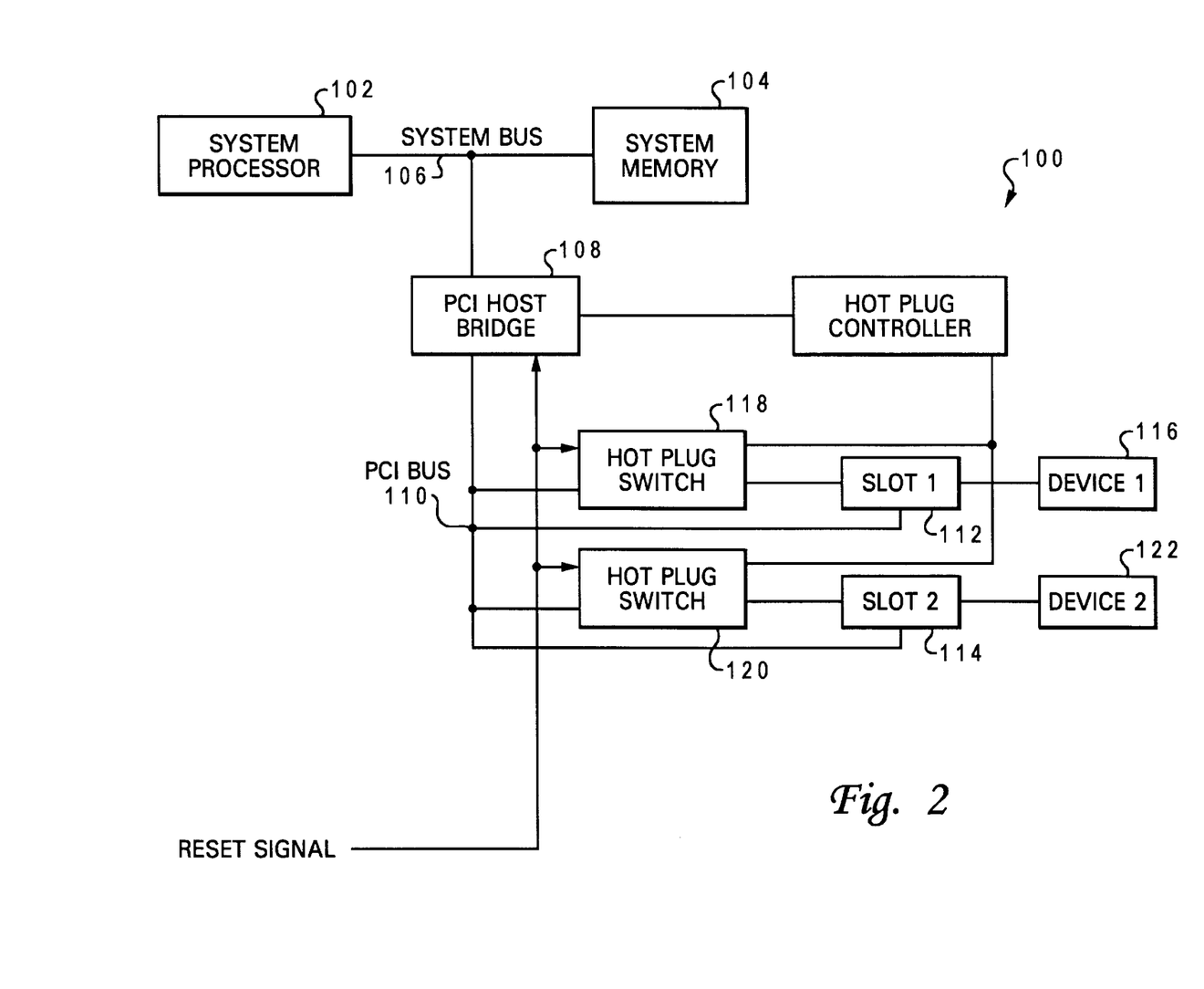
FIG. 2 is a block diagram of one embodiment of a computer system constructed in accordance with the present invention, having a PCI bus with a plurality of slots for receiving peripheral devices, and a "hot-plug" controller used to initialize the devices while the remainder of the system is still running.

With reference now to the figures, and in particular with reference to FIG. 2, there is depicted one embodiment of a computer system 100 constructed in accordance with the present invention. System 100 includes a CPU or processor 102 connected to a system memory device 104 using a system bus 106. A Peripheral Component Interconnect (PCI) host bridge 108 is used to couple a PCI local bus 110 to system bus 106. Various peripheral devices may be removably connected to the system using a plurality of slots, two of which 112 and 114 are shown. Each slot is connected to PCI bus 110 using respective hot-plug switches 118 and 120, which can be used to isolate all appropriate signals on a slot from bus 110 while the rest of the platform is running. A hot-plug controller 124 is also connected to PCI host bridge (PHB) 108 and each of the hot-plug switches 118 and 120.

Figure 3:
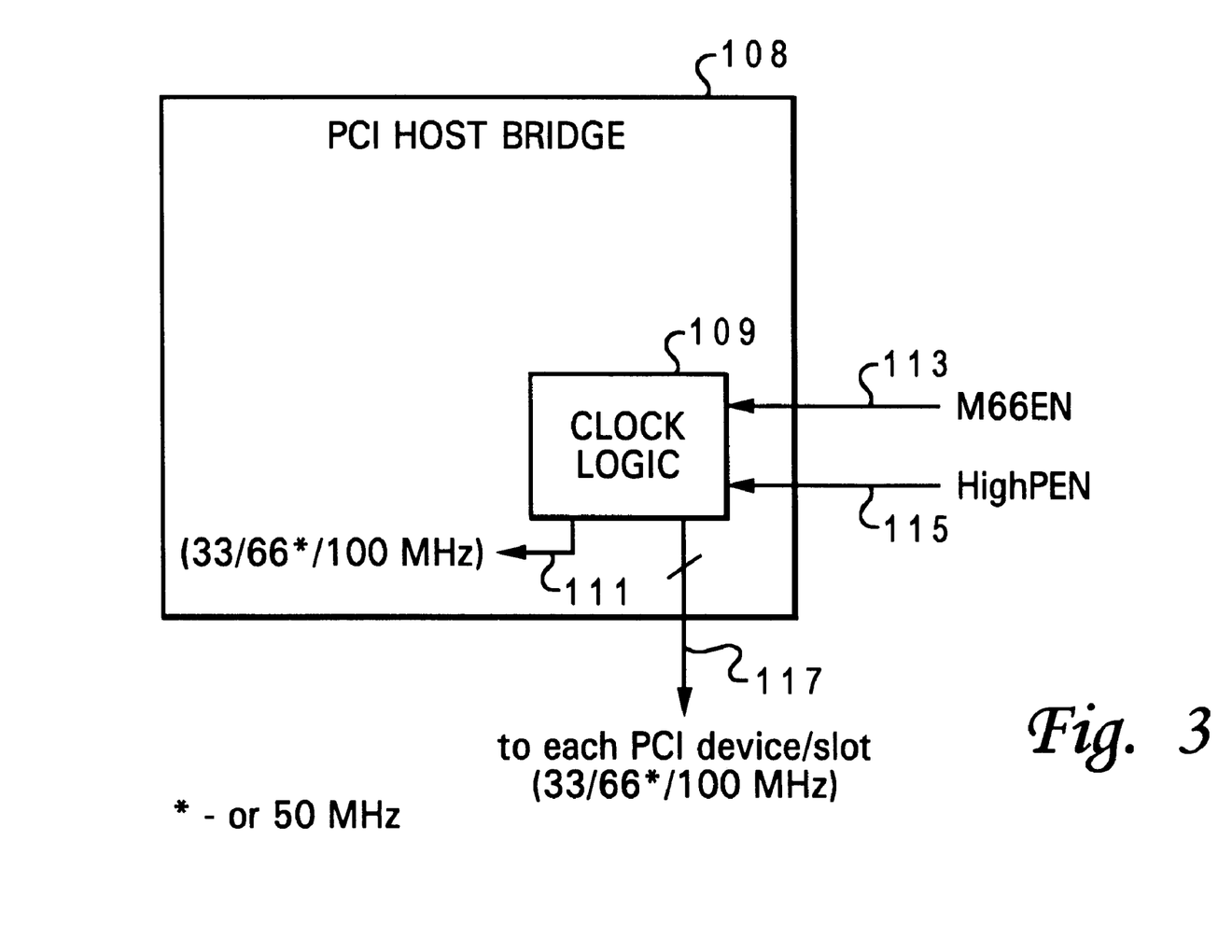
FIG. 3 is block diagram illustrating connections to the clock logic of the PCI host bridge of FIG. 2.

With further reference to FIG. 3, the PCI host bridge 108 includes PCI clock logic 109 which provides separate clock lines 117 to each PCI device, and to the PCI host bridge itself 111. The PCI host bridge clock logic 109 determines the operating frequency supported by the attached devices by serving both the M66EN pins 113 and the HighPEN 115 lines from each device, and provides the appropriate frequency to the devices.

In the depicted embodiment, computer system 100 is compliant with the hot-pluggable design set forth in the document "PCI Hot-Plug Specification," revision 1.0, published by the PCI Special Interest Group (PCI SIG) (Oct. 6, 1997), which is hereby incorporated. As such, slots 112 and 114 are designed for adapter cards that are 32-bits or 64-bits wide, and use 3.3 volt or 5 volt signaling as appropriate. An adapter card (device 116 or device 122) could contain a single PCI device or multiple devices behind a PCI-to-PCI bridge. Each slot has a logical slot identifier that uniquely identifies a particular slot.

Hot-plug controller 124 controls the electrical aspects of powering up and down a PCI slot. More than one hot-plug controller can be used. A software driver (hot-plug system driver) is used to control and monitor hot-plug controller 124. If there is more than one hot-plug controller, then more than one hot-plug system driver can be used. Higher-level software (a hot-plug "service") has overall control of the hot-plug operations. This service includes a user interface, and can issue requests to the operating system to quiesce adapter activity, and further issue requests (primitives) to the hot-plug system driver to turn the slots on or off, using switches 118, and 120.

The present invention is directed to a high performance PCI bus which provides backward compatibility with prior art designs. In the illustrative embodiment, the bus uses a 100 MHz clock speed for high performance operation, and provides backward compatibility for 33 MHz or 66 MHz operation. High performance operation is achieved using a bus 110 which has a high performance construction in accordance with the present invention, using a PHB 108 which has a high performance construction in accordance with the present invention, and using one or more high performance devices 116, 122 which likewise have a high performance construction in accordance with the present invention. It is understood, however, that the scope of the invention also includes a system running at a lower (prior art) performance level, provided that it includes at least one of these high performance components, running in a backward compatible mode.

The illustrative embodiment operates the PCI bus at higher clock rates than the currently defined PCI 66 MHz protocol by prohibiting pacing between data cycles, and by allowing another clock cycle during both the address/command phase and the termination phase of a bus transfer. The following new protocol specifications provide good backward compatibility while allowing higher performance capability.

The maximum frequency (e.g., 100 MHz) is selected as the design point for bridges and adapters (i.e., bridges and adapters must design to that maximum frequency and the resulting timing requirements for that frequency). The maximum number of slots for this implementation (100 MHz) is restricted to two slots. In accordance with the prior art design, operation at 66 MHz is also restricted to two slots. As operating frequency increases, loading effects degrade the signals. Based on current technology and design considerations, the bus is effectively limited to five loads at these higher frequencies. This number should not, however, be construed as a limitation since other design trade-offs or improvements in related technology could allow more loading of the bus (i.e., more than two slots). The frequency on the PCI bus to the adapters and bridges can be reduced for added slots (for both 32-bit and 64-bit connectors). Operation at frequencies of 50 MHz or less allows a total of up to four slots.

The present invention preferably provides split transaction capability, with split transaction support required for adapters and optional for bridges. Split transactions are those wherein the address of a value requested by an adapter (master) is kept latched in the bridge (slave), such that the transaction can complete immediately even when the bridge does not have the data, with the bridge later becoming the bus master to write the data to the adapter in a separate transaction. A delayed transaction is one wherein the bridge issues a "retry" response, such that the adapter must repeat the request. In this implementation, a high performance PHB 108 is able to alias split transactions to delayed transactions, or optionally fully support split transactions.

It is possible to implement the present invention with a "dynamic dual mode," wherein operation may be dynamically switched between different bus frequencies but, in the preferred embodiment, this feature is not enabled. Thus, if a standard 66 MHz card is installed in a high performance slot/bus, the bus will always operate only in 66 MHz mode, even if a high performance device is present on the bus. Use of dynamic dual mode presents certain design restrictions. See U.S. Pat. No. 5,838,995, which is hereby incorporated.

High performance operation is selected using a pin on the bridges and adapters which is referred to herein as the "HighPEN" pin (high performance enable). The HighPEN pin (which may correspond to an existing ground pin on prior art devices) is utilized with the conventional PCI M66EN pin as shown below:

| M66EN | HighPEN | |
|---|---|---|
| 0 | 0 | 33 MHz card installed |
| 1 | 0 | 66 MHz card installed |
| 1 | 1 | 100 MHz (high performance) card installed |

As can be inferred from this table, a HighP PCI board does not ground the M66EN pin. High performance masters and targets look at the M66EN and HighPEN pins to determine if the operation is to follow the HighP PCI protocol or standard PCI protocol. The PCI host bridge also looks at the M66EN and HighPEN pins to determine whether configuration operations are to use standard PCI protocol or HighP PCI protocol.

The PCI clock provides a separate clock line for every device on the bus including the PCI host bridge. The clocks are preferably provided within the PCI host bridge, but the clocks could be provided by a separate (external) clock source. The present invention contemplates the option of clocking data on both clock edges (rising and falling). In this manner, 100 MHz operation may be achieved using a 50 MHz clock speed, allowing more time for decision making by the adapters. Clocking of both edges can be enabled via a configuration bit. The peak bandwidth is 800 MB/s at 50 MHz (clock on both edges) and 64-bits, and 800 MB/s at 100 MHz and 64-bits (clock on one edge). In this implementation, the 50 MHz clock can be used in lieu of a 66 MHz clock if the system is to operate in 66 MHz mode.

As noted above, the present invention includes a system using any of the novel, high performance components, even if the system is running at a lower performance level (i.e., 33 MHz mode or 66 MHz mode). The above discussion describes how a system may be provided with a high performance bus, but not operate in high performance mode due to the presence of either a low performance bridge, or a low performance device in one of the slots. Conversely, the invention contemplates the use of a high performance bridge or adapter operating in a backward compatible mode when a low performance bus is present, that is, the high performance bridge or adapter not only operates at the lower speed, but also according to the lower performance protocol. In the illustrative embodiment, this capability is provided by a new sideband pin on the bridge or adapter that normally floats. When the device is installed on a bus having more than two slots, this new sideband pin is grounded. In this case, when this pin is grounded, the bus operating frequency is reduced to 33 MHz for backward compatibility.

This invention with its backward compatibility features makes the high performance PCI capability fully backward compatible with the current architecture definitions for 33 MHz and 66 MHz PCI components and, in addition, provides full backward compatibility with the current architecture definitions of PCI hot plug. The current PCI hot plug architecture requires that slots must be isolated and powered down to perform the hot plug, while allowing the remainder of the system and PCI I/O to remain powered and operational. The following table illustrates bus configurations that provide backward compatibility in terms of number of slots per bus, bus operating frequency, and hot plug characteristics:

|  | 33 MHz Bus (4 slot) | 66 MHz Bus (2 slot) | 50 MHz Bus (HighP, 4 slot) | 100 MHz Bus (HighP, 2 slot) |
| --- | --- | --- | --- | --- |
| 33 MHz device | Bus runs at 33 MHz* | Bus runs at 33 MHz* | Bus runs at 33 MHz* | Bus runs at 33 MHz* |
| 66 MHz device | Bus runs at 33 MHz | Bus runs at 66 MHz | Bus runs at 33 MHz | Bus runs at 50/66 MHz* |
| 100 MHz (HighP) device | Bus runs at 33 MHz | Bus runs at 66 MHz | Bus runs at 50 MHz | Bus runs at 100 MHz |

*cannot un-isolate the device following hot plug due to current bus operating frequency, without first resetting other device on bus and dropping to lower frequency Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, an alternative option is to provide a HighP bus with only one slot (point-to-point, with a bridge chip plus one slot). Such a configuration facilitates operation at speeds of more than 100 MHz due to decreased loading. It is therefore contemplated that such modifications can be made without departing from the spirit or scope of the present invention as defined in the appended claims.

What is claimed is:

1. A method of providing selectable data transmission speeds between a peripheral device and a system bus of a computer system, said method comprising the steps of:
   connecting a bridge to the system bus, said bridge being capable of transmitting data at a plurality of transmission speeds;
   coupling said peripheral device to said bridge trough a peripheral bus, said peripheral device and said peripheral bus being capable of transmitting data at a plurality of transmission speeds;
   determining a transmission speed common to all of said peripheral device, said peripheral bus, and said bridge to transmit data, said transmission speed having an associated performance mode with a transmission control protocol; and
   setting an effective transmission speed of said bridge, said peripheral bus and said peripheral device by clocking data on both a rising edge and a falling edge of a clock signal.

2. The method of claim 1, wherein when said common transmission speed is a first transmission speed, which has a low performance mode and a first transmission protocol, and wherein said determining step determines that at least one of said peripheral device, said peripheral bus, and said bridge is limited to operate in said low performance mode said method includes the steps of:
   selecting said low performance mode to transmit said data; and
   operating said bridge, said peripheral bus and said peripheral device in said low performance mode.

3. The method of claim 1, wherein when said common transmission speed is a second transmission speed, which has a high performance mode and a second transmission protocol, said method includes the steps of:
   selecting said high performance mode to transmit said data; and
   operating said bridge, said peripheral bus and said peripheral device in said high performance mode.

4. The method of claim 1, wherein said step of connecting said peripheral device to said peripheral bus includes the steps of:
   connecting a slot to said peripheral bus; and
   inserting said peripheral device into said slot.

5. The method of claim 4, wherein said step of connecting said peripheral device to said peripheral bus includes the further steps of:
   isolating said slot from said peripheral bus before said inserting step;
   applying a reset signal to said slot, after said inserting step; and
   initializing said peripheral device in response to said applying step.

6. The method of claim 1, wherein said bridge is adapted to selectively operate in either a high performance mode or a low performance mode, said method further comprising the steps of:
   determining that at least one of said peripheral bus and said peripheral device is limited to operation in said low performance mode; and
   in response to said determining step, selecting said low performance mode for operating said bridge, and operating said peripheral bus and said peripheral device in said low performance mode.

7. The method of claim 6, further comprising the steps of:
   determining that said peripheral bus and said peripheral device operate in said high performance mode; and
   in response to said determining step, selecting said high performance mode for operating said bridge, and operating said peripheral bus and said peripheral device in said high performance mode.

8. The method of claim 7, wherein said operating step operates said bridge, said peripheral bus and said peripheral device in said high performance mode at said first operating speed which is approximately twice said second operating speed, by clocking data on only one clock edge of a clock signal.

9. The method of claim 7, wherein said operating step operates said bridge, said peripheral bus, and said peripheral device in said high performance mode at said first operating speed which is approximately twice said second operating speed, by clocking data on both a rising edge and a falling edge of a clock signal which is also used for said second operating speed.

10. The method of claim 1, wherein said peripheral device is adapted to selectively operate in either a high performance mode or a low performance mode, said method further comprising the step of in response to determining that at least one of said peripheral bus and said bridge is limited to operation in said low performance mode, selecting said low performance mode for operating said bridge, and operating said peripheral bus and said peripheral device in said low performance mode.

11. The method of claim 1, wherein said peripheral bus is adapted to selectively operate in either a high performance mode or a low performance mode, said method further comprising the step of in response to determining that at least one of said peripheral device and said bridge is limited to operation in said low performance mode, selecting said low performance mode for operating said bridge, and operating said peripheral bus and said peripheral device in said low performance mode.

12. A computer system comprising:
a system bus;
a memory device connected to said system bus;
processor means, connected to said system bus, for carrying out program instructions stored in said memory device;
a bridge connected to said system bus, wherein said bridge is adapted to selectively operate in either a high performance mode or a low performance mode and includes a pin to receive an indication of whether said peripheral bus and said peripheral device may operate at a first operating speed and a second operating speed that is less than the first operating speed;
a peripheral bus connected to said bridge, said peripheral bus operating at a particular data transmission rate;
a peripheral device connected to said peripheral bus;
means for determining when all of said peripheral device, said peripheral bus, and said bridge are adapted to operate at the first operating speed; and
means for operating at said first operating speed by clocking data on both a rising edge and a falling edge of a clock signal.

13. The computer system of claim 12, wherein:
said peripheral device is adapted to selectively operate in either said high performance mode or said low performance mode; and
said peripheral device includes a pin to indicate whether said peripheral device may be operated in said high performance mode.

14. The computer system of claim 12, wherein when said determining means determines that each of said bridge, said peripheral bus, and said peripheral device operate in a high performance mode, which has a transmission control protocol corresponding to a faster data transmission speed than said low performance mode, wherein further said particular data transmission rate is at least equal to a rate associated with said high performance mode.

15. The computer system of claim 14, further comprising means for generating said first operating speed at approximately twice said second operating speed, by clocking data on only one clock edge of a clock signal.

16. The computer system of claim 12, wherein said peripheral device is connected to said peripheral bus using a slot and further comprising means for isolating said slot from said peripheral bus before said peripheral device is inserted in said slot.

17. The computer system of claim 12 wherein:
said peripheral device provides split transaction capability; and
said bridge includes means for supporting split transactions and aliasing split transactions to delayed transactions.

18. A system for providing selectable operation protocols and associated data transmission speeds between a peripheral device and system bus of a computer system, said system comprising:
a peripheral bus designed for transmitting data with at least one of multiple transmission speeds including a first transmission speed associated with a first protocol and a second transmission speed associated with a second protocol, wherein said second transmission speed is faster than said first transmission speed;
a peripheral device connected to said peripheral bus, said peripheral device operating at one of said first transmission speed and said second transmission speed;
a hot plug controller coupled to a plurality of slots utilized to connect said peripheral device to said peripheral bus and which monitors said device for operation characteristics including transmission speed;
a bridge, coupled to said system bus and to said hot plug controller, said bridge including a control mechanism by which a transmission speed on said peripheral bus is selected for data transmission to and from said peripheral device based on operational limitations imposed by one or more of said peripheral device, peripheral bus, or bridge.

19. The system of claim 18 further including a hot plug switch, wherein said hot plug controller is first coupled to said hot plug switch, and said hot plug switch is further coupled to said slot and said peripheral bus, wherein said hot plug controller selects said peripheral device from among multiple devices by powering up and down said slot associated with said peripheral device utilizing said hot plug switch.

20. The system of claim 18 further including a reset signal bus coupled to said bridge and said hot plug switch and which provides a reset signal input to reset a transmission rate of said peripheral bus, said bridge and said device to a transmission rate of said peripheral bus.

21. The system of claim 18, wherein said control mechanism of said bridge includes a clock logic with high pin and low pin inputs, wherein said high pin input and low pin input are utilized to select a protocol type and operating speed for said peripheral bus, said driver, and said peripheral device.

22. The computer system of claim 12, wherein when said determining means determines that at least one of said bridge, said peripheral bus, and said peripheral device is adapted to operate in a low performance mode, said computer system has means for selecting said low performance mode for transmission of data to and from said peripheral device.

23. The computer system of claim 12, wherein said peripheral bus is a high performance bus and said bridge and peripheral device are low performance devices, wherein said means for selecting selects a low performance operating mode for data transmission.

24. The computer system of claim 12, wherein said peripheral bus is a low performance bus and said bridge and peripheral device are high performance devices, wherein said means for selecting selects a low performance operating mode for data transmission.

25. A method of providing backward compatibility for a high performance Peripheral Component Interconnect (PCI) bus within a data processing system, said method comprising the steps of:
   connecting a bridge to a system bus of said data processing system;
   connecting a PCI bus to said bridge;
   connecting a peripheral device to said peripheral bus;
   determining a performance mode common to all of said peripheral device, said PCI bus, and said bridge, wherein said performance mode transmits data at a particular speed utilizing an associated transmission protocol; and
   transmitting data between said bridge and said peripheral device utilizing said common performance mode, wherein when said performances mode is a low performance mode, said data is transmitted at a first speed with a standard transmission protocol and when said performance mode is a high performance mode, said data is transmitted at a second speed, which is faster than said first speed and with a second transmission protocol that operates the PCI bus at higher clock rates by prohibiting pacing between data cycles.

26. The method of claim 25, wherein said transmitting step further comprises the step of inserting a cycle in both the address/command phase and a termination phase of a transfer of data via said PCI bus to enable backward compatibility.

27. The method of claim 25, further comprising the step of enabling said second transfer protocol to change from said low performance mode to said high performance mode.

28. The method of claim 27, wherein said bridge includes a plurality of pins utilized to select the transmission protocol, wherein said enabling step includes the step of automatically setting a pin of said bridge to a selected value when said second transmission protocol is desired.

29. The method of claim 25, wherein response to determining that at least one of said peripheral device, said PCI bus, and said bridge is limited to operate in said low performance mode, said method includes the steps of:
   selecting said low performance mode to transmit said data; and
   operating said bridge, said peripheral bus and said peripheral device in said low performance mode.

30. The method of claim 25, wherein in response to determining that all of said peripheral device, said PCI bus, and said bridge can operate in said high performance mode, said method includes the steps of:
   selecting said high performance mode to transmit said data; and
   operating said bridge, said peripheral bus and said peripheral device in said high performance mode.

* * * * *

UNITED STATES PATENT AND TRADEMARK OFFICE
CERTIFICATE OF CORRECTION

PATENT NO. : 6,185,642 B1
DATED : February 6, 2001
INVENTOR(S) : Beukema et al.

It is certified that error appears in the above-identified patent and that said Letters Patent is hereby corrected as shown below:

Title page,
Item [54], please delete the tile: BUS FOR HIGH FREQUENCY OPERATION WITH BACKWARD COMPATIBILITY AND HOT-PLUG ABILTY.
and insert instead: -- HIGH PERFORMANCE PCI BUS FOR HIGH FREQUENCY OPERATION WITH BACKWARD COMPATIBILITY AND HOT-PLUG ABILITY. --

At the top of Col. 1, please delete the tile: BUS FOR HIGH FREQUENCY OPERATION WITH BACKWARD COMPATIBILITY AND HOT-PLUG ABILITY.
and insert instead: --HIGH PERFORMANCE PCI BUS FOR HIGH FREQUENCY OPERATION WITH BACKWARD COMPATIBILITY AND HOT-PLUG ABLITIY. --

Claims,
Claim 1,
Line 62, please delete "trough a" and insert instead -- through a --.

Claim 29,
Line 10, please delete "wherein response" and insert instead -- wherein in response --.

Signed and Sealed this

Eleventh Day of December, 2001

*Attest:*

*Attesting Officer*

NICHOLAS P. GODICI
*Acting Director of the United States Patent and Trademark Office*